INVENTOR.
JOHN W. GREENLEAF, JR.
BY Watson, Cole, Grindle & Watson
attorneys

JOHN W. GREENLEAF, JR.
INVENTOR.

May 26, 1964     J. W. GREENLEAF, JR     3,134,735
OPEN GRAVITY FILTERS

Filed Nov. 28, 1961     4 Sheets-Sheet 3

JOHN W. GREENLEAF, JR.
INVENTOR.

May 26, 1964

J. W. GREENLEAF, JR 3,134,735

OPEN GRAVITY FILTERS

Filed Nov. 28, 1961

BACKWASH
SIPHON

INLET
SIPHON

JOHN W. GREENLEAF, JR.
INVENTOR.

BY
Watson, Cole, Grindle & Watson
Attorneys

United States Patent Office 3,134,735
Patented May 26, 1964

3,134,735
OPEN GRAVITY FILTERS
John W. Greenleaf, Jr., Coral Gables, Fla., assignor to Greenleaf Enterprises, Inc., Miami, Fla., a corporation of Florida
Filed Nov. 28, 1961, Ser. No. 155,262
5 Claims. (Cl. 210—264)

This invention relates to a gravity flow backwash filter of the type employing a filter bed of particulate material.

It has heretofore been known in a filter to employ a plurality of filter units connected in parallel with common influent and effluent passages and having provision for backwashing one or more filter units with backwash liquid supplied at a constant rate of flow from the effluent passage, while the other units continue their normal filtering operation and maintain a substantially constant head of liquid in the effluent compartment. Such prior filters however have required the provision of a plurality of expensive valves for each unit in order to control the backwashing operation and it has been necessary to control the several valves of each unit in proper sequence. The resulting structure has accordingly been comparatively expensive to construct and difficult to operate.

It has also been known in the past to provide a valveless filter utilizing a siphon for accomplishing the backwashing function. This, however, has required the provision in each filter unit of an elevated backwash water storage tank or flush tank individual to that unit. The arrangement has been such that the water from the flush tank has been substantially exhausted and thereafter replenished during each backwash cycle, and the flow of backwash water through the filter bed has accordingly been at a constantly diminishing rate incident to exhausting of the supply.

Thus, in order to provide a successful gravity flow backwashing filter of the above type in accordance with the known prior art, it has been necessary either to provide a plurality of expensive valves in association with each filter unit, or to provide in connection with each filter unit a special elevated flush tank for storing backwash water and to forego the advantage of a constant backwash rate.

With the foregoing considerations in mind, it is a primary object of the present invention to achieve a filter structure completely eliminating liquid valves while attaining a constant rate of backwash flow directly from the filtrate conduit, all without necessity for elevated storage tanks for the backwash water.

It is a further object to provide such a filter in which a single siphon for each filter unit is capable of controlling the entire backwash operation for that unit and thus is capable of assuming the functions of the plural valves heretofore required for this purpose in filters employing a constant flow backwash rate.

It is a further object to provide such a filter incorporating a plurality of similar filter units in which the supply of influent to each filter unit is selectively controllable by a siphon and in which the backwashing operation for each unit also is controllable by siphon means, the latter siphon means being operable to control the backwashing action entirely independently of the inlet siphon. Contributing to this result is a novel arrangement in which any influent entering into a unit during the backwashing cycle is automatically caused to bypass the filter bed.

It is a further object of the invention to provide a filter comprising a battery of filter units adapted for fabrication almost exclusively from concrete or other analogous cast material and in a manner to achieve great compactness and economy of construction as compared with prior filters.

Thus, in accordance with the instant invention each filter unit has a drain passage beneath its filter bed which is in free bi-directional communication at all times with a supply of filtered backwash liquid or filtrate maintained at a normal level above the filter bed, together with a backwash siphon arranged to drain the influent from above the filter bed to a level below that of the supply of backwash liquid, whereby a backwash flow of said liquid through the drain passage and the filter bed may occur solely in response to differences of level of the influent liquid and the filtered liquid in the said backwash supply.

Also, in accordance with the invention, a plurality of parallel rows of the filter units are disposed in spaced relation in such manner as to permit disposition between them of vertically superposed influent and effluent conduits or passages common to the several filter units of each row. By disposing these conduits or passages thus between the rows of filter units it is possible to effect substantial economies of space and material due to the decrease in the length of such conduit per filter unit. It is also possible, because of the central position of the conduits between spaced rows of such units, to define at least one of the conduits or compartments by the adjoining wall portions of the filter units. It is also possible and desirable in such a structure to utilize a portion of a common concrete slab to define the bottoms of the said conduit or compartment and of the various filter units.

For purposes of exemplification, there is illustrated in the accompanying drawings a preferred embodiment of the present invention in which.

Figure 1:
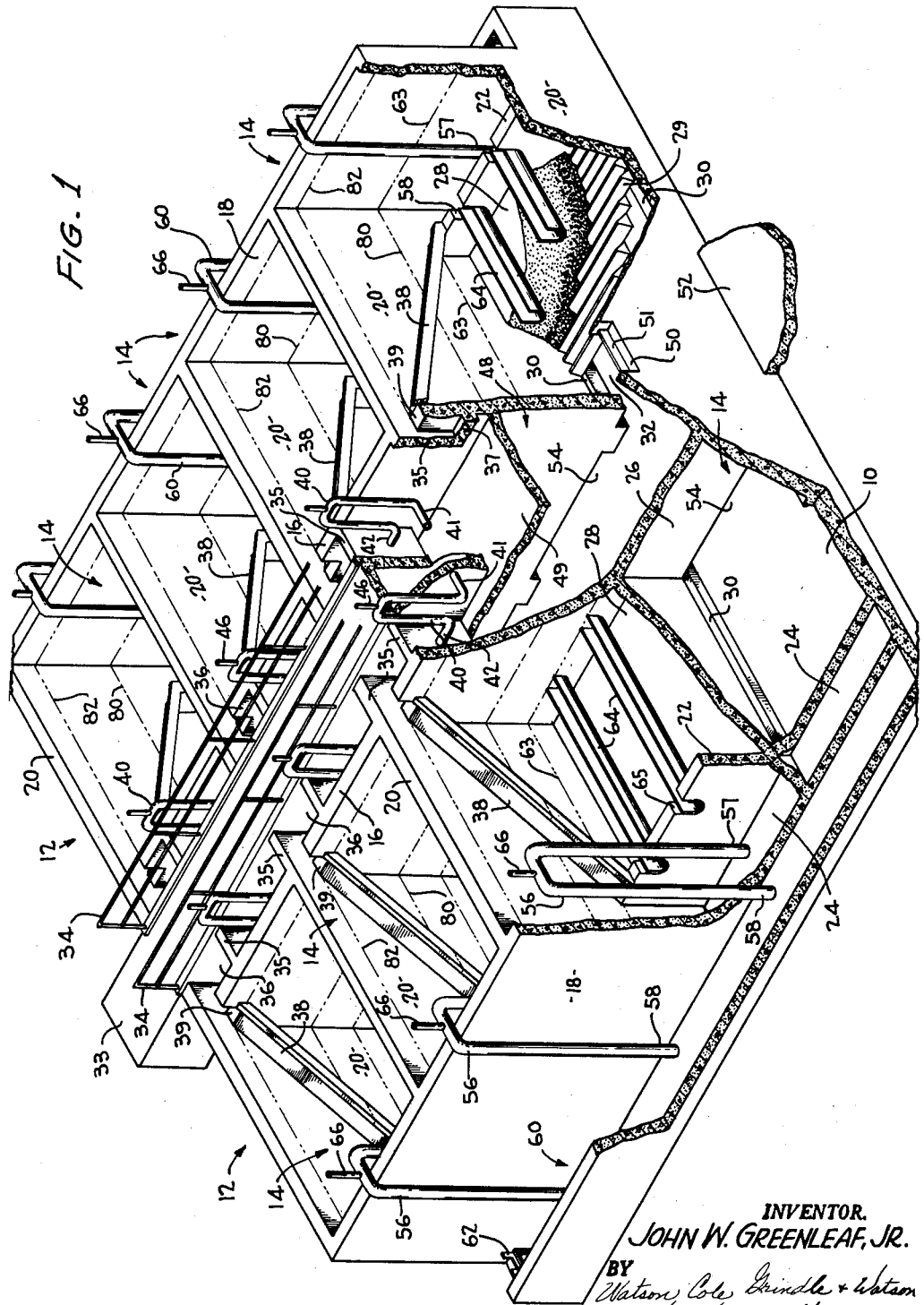
FIGURE 1 is a perspective view, with parts broken away, of a filter incorporating the features of the invention.
Figure 2:
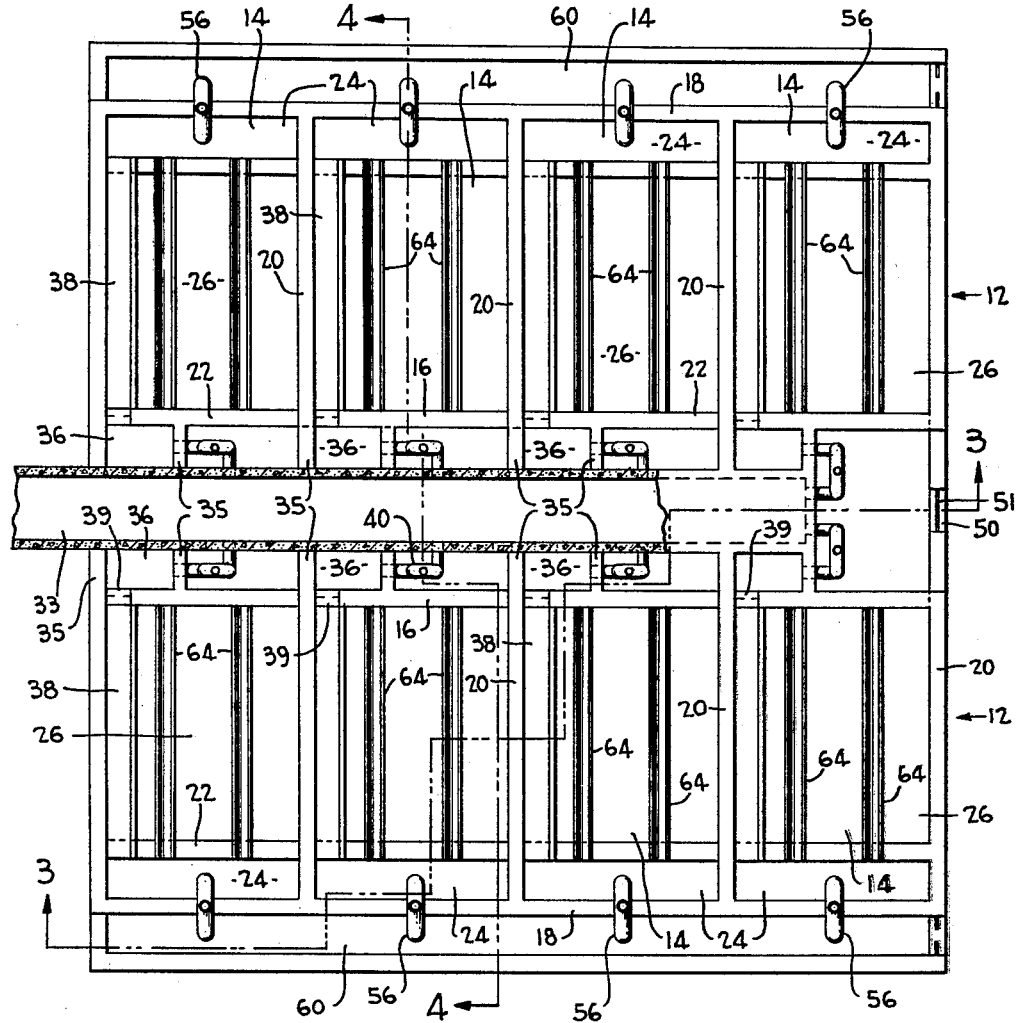
FIGURE 2 is a plan view, also with parts broken away, of the structure shown in FIGURE 1.
Figure 3:
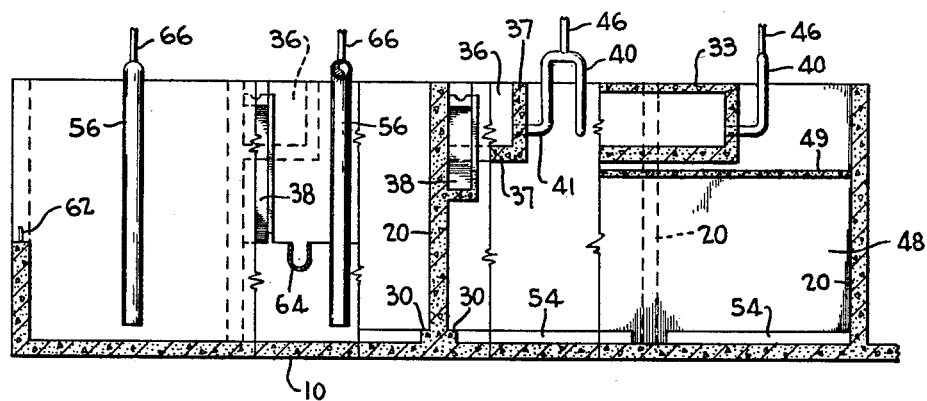
FIGURE 3 is a section on the line 3—3 of FIGURE 2.

Referring now in detail to the accompanying drawings, it will be seen from FIGURES 1 thru 4 that the preferred filter of the invention is in the form of a filter battery in which the various units and other component parts may advantageously be supported on and utilize a common bottom slab or base 10 of concrete, with various partitioning walls similarly of concrete rising generally vertically from this to define the various other components. There are provided two relatively spaced parallel rows, each generally designated 12, of identical filtering units 14. Each row 12 contains a plurality of the units 14 with the units of the respective rows being disposed symmetrically and in opposed relation to each other. The two rows 12 of filter units illustrated are formed with relatively adjacent parallel vertical walls 16, which are spaced apart as shown, and with relatively remote parallel walls 18—18. The space between the parallel walls 16 and 18 of each row is subdivided into a plurality of the filter units 14 by a series of transverse vertical walls 20 extending upwardly from the base slab or bottom 10 and defining partitions between the walls 16 and 18.

Figure 6:
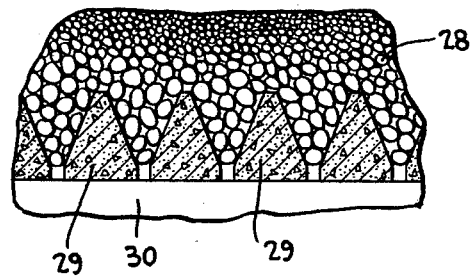
FIGURE 6 is a greatly enlarged fragmentary cross section through one of the filter beds showing certain details of the construction thereof.

It is desirable to provide a relatively low overflow or partition wall 22 in each unit projecting upwardly from the bottom thereof and extending between its opposed transverse walls 20—20 to subdivide the interior of each filter unit into a filter forebay 24 adjacent to the remote wall 18 and a filter section 26 bounded by the walls 16, 20—20 and 22. The filter section of each filter comprises a horizontal filter bed 28 which may be of any usual construction, though in the instant embodiment it is shown as comprising a usual bed of particulate material such as sand and gravel, supported on a plurality of relatively spaced beams 29 which are elevated slightly above the floor 10 by having their opposite ends supported on ledges 30—30 at the opposite sides of the filter section adjoining the walls 20—20. As shown in detail in FIGURE 6, the several beams 29 may advantageously be of substantially trapezoidal cross section spaced slightly apart at their bases to permit free drainage of liquid between them. The coarser or larger particles of gravel in the filter bed 28 are disposed on and between the adjacent relatively converging surfaces of adjoining such beams 29 and the smaller particles of gravel and sand are thus kept by these larger particles from escaping between the beams 29.

By virtue of the spacing of the filter bed 28 above the bottom 10 of the filter section it will be seen that each filter section is provided beneath its filter bed with a drainage space 32 to receive the filtered liquid which has percolated downwardly through the filter bed from above.

The liquid to be filtered is delivered on to the respective filter beds 28 from influent supply means comprising an influent conduit 33, preferably of rectangular cross section as shown, which is fixedly supported between and parallel to the relatively adjacent walls 16 of the rows of filters at an elevation appreciably above the filter beds 28 of the respective filter units. It will be appreciated, of course, that the various filter beds 28 are all disposed at substantially a common level.

In the filter structure herein illustrated, the top of the influent conduit 33 is utilized as a walkway extending between the rows of filter units and from which the operator may freely inspect the liquid levels in the various filter units. It is accordingly desirable to provide the handrails 34 on opposite sides of the walkway thus defined by the element 33.

For delivering the influent liquid by gravity from the conduit 33 into the several filter units 14 and for selectively controlling such delivery to each unit, there is provided in association with each such unit a liquid seal box 36 having relatively spaced transverse walls 35—35 extending between the wall 16 and the adjoining side wall of the conduit 33, together with the bottom slab 37, the resulting structure being in the form of an upwardly opening box. In such an arrangement, the various walls are all interconnected and preferably formed as integral parts of a common concrete structure whereby the walls and bottom 35 and 37 respectively, through their rigid connections with both the conduit 33 and walls 16, jointly support the conduit 33 at the desired level.

Figure 4:
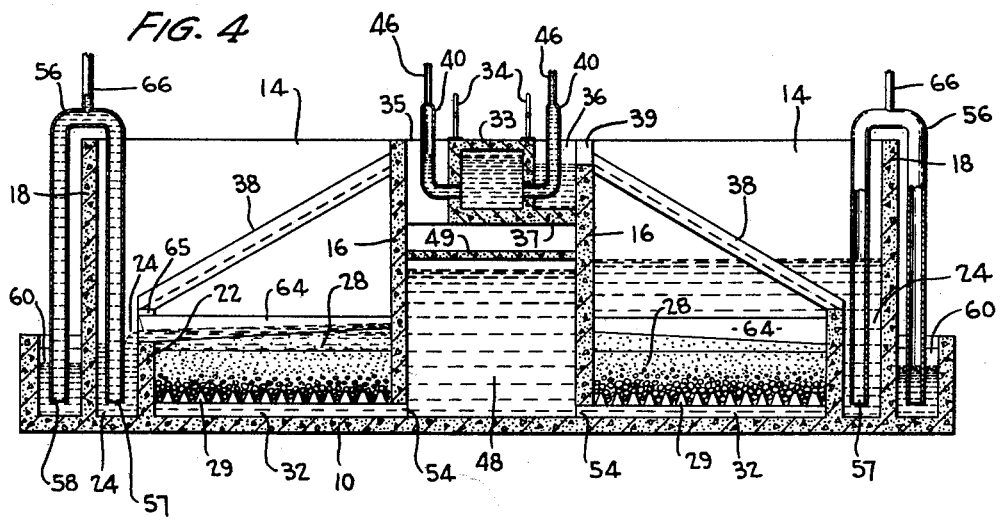
FIGURE 4 is a section on the line 4—4 of FIGURE 2.

As shown in FIGURES 1 and 4, a trough 38 receives the predetermined discharge from a weir set in opening 39 at one end of each such seal box 36, said weir maintains the level of the liquid within the box somewhat below the normal level of the liquid in the influent conduit 33. Normally the conduit 33 will be maintained substantially completely full of liquid so that the liquid level therein is maintained at a constant level sufficiently above the level in box 36 to permit the required flow through siphons 40.

From the liquid seal box or weir box 36, each trough 38 slopes downwardly and across the filter sections and filter bed 28 of its respective unit and discharges its liquid into the forebay 24 of its unit to one side of the filter bed, whereby the turbulence of the inflowing liquid may subside within the forebay, following which the liquid from the forebay moves out laterally over the wall 22 and through and over the sides of trough 64 above the filter bed 28 to thereafter pass downwardly through the filter bed.

Although the troughs 38 might continue to supply water into the forebay 24 even during the backwashing operation, in which event the water would merely be caused to bypass the filters or filter beds, as will hereinafter appear, it is desirable to provide means in association with each filter unit operable selectively to supply or discontinue the supply of influent liquid to its respective filter unit. It is to this end that in the present embodiment the several filter seal boxes 36 are arranged to maintain the liquid therein at a level slightly below the level of liquid within the influent supply conduit 33. Because of this difference in level it is possible to supply the liquid from the conduit 33 into each box 36 through a siphon 40 having an intake end 41 communicating with the interior of conduit 33 and a discharge end 42 opening into box 36 at a level below its intake end and below the level of liquid within the box, so that this liquid will at all times provide a liquid seal for the discharge end 42. Each siphon 40 between its ends is elevated and reversely curved in usual manner, the elevation of its reversely curved or reentrant portion being, of course, above that of the influent conduit 33. In order to control the passage of liquid through each siphon 40, there is provided, in connection with each such siphon, means in the form of a conduit or pipe 46 communicating with the elevated portion of the siphon 40 for evacuating air therefrom in order to prime it and commence the flow of liquid therethrough, or alternately operative to vent the said elevated portion of the siphon to the atmosphere whereby to discontinue the flow of liquid therethrough. Suitable evacuating and venting means are described more fully hereinafter.

For draining away the effluent or filtrate from the respective units after it has passed through the filter beds thereof, there is provided a filtrate conduit 48 which is preferably disposed beneath the influent conduit 33 in the space between the two rows of filter units. The filtrate conduit 48 may advantageously be formed or defined by the lower portions of the relatively adjacent side walls 16—16 of the respective rows of the units and the portion of the floor slab 10 extending therebetween. In order to protect the filtrate within this conduit from contamination it is desirable to provide a cover slab 49 extending between the opposed walls 16 at a level above the floor 10 and beneath the influent conduit 33. The filtrate escapes from conduit 48 through an opening 50 having a lower edge defined by weir 51 for maintaining the contents of the conduit at a substantially constant level above the various filter beds 28 but, nevertheless, below the level of influent liquid in boxes 36. The lower portion of filtrate conduit 48 is at all times in free bi-directional communication through passages 54 (FIGURES 1 and 4) with each of the filter drain passages 32. By virtue of this free and unrestricted communication and the freedom of the filtrate to flow through the passages 54 either toward or away from the conduit 48, it will be relatively apparent that the direction of such flow will be controlled solely by differences in level in the liquid influent above the filter bed and the liquid filtrate in the compartment or conduit 48. Since the influent liquid normally has a considerably greater head, or in other words, is normally at a substantially higher level than the filtrate within the conduit 48, it is obvious that during normal filtering operation the influent will pass downwardly through each filter bed and after being filtered, will be received within the drain passage 32 beneath its respective bed. From there it will pass into the conduit 48 and eventually into a storage reservoir 52 in which it is received after passing over the weir 51 in the conduit outlet opening 50, the bottom portion 52 only of the reservoir being shown in FIGURE 1.

For the purpose of lowering the level of liquid above the filter bed in any given unit to induce the backwashing action of the filtrate from the conduit 48 through the passages 54 and 32 and upwardly through the filter bed 28 of said unit, there is provided in accordance with the present invention a novel arrangement and disposition of backwash siphon 56 which, as shown in FIGURE 4, preferably has its intake end 57 depending into the filter forebay 24 of its respective unit to a level substantially below the normal upper level of the filtrate in conduit 48 and preferably well below any overflow openings in the partition wall 22. The forebay 24 thus forms a receptacle having free communication with its associated filter unit at a level above the filter bed thereof. Such receptacle entraps and maintains a supply of liquid at a suitable level to form a liquid seal for the depending intake end of its associated backwash siphon. It will be seen that the siphon 56 extends up and over the outer or remote wall 18 of its respective unit and thence extends downwardly with its lower or discharge end 58 received beneath the normal level of liquid in a liquid trap defined by a discharge trough 60. Such troughs 60 extend along the bases of the respective walls 18 exteriorly thereof for reception of the discharge ends of all of the siphons 56. Each such trough 60 is provided with means for preventing escape of liquid below a predetermined level. Such means, as shown in FIGURE 1, may conveniently assume the form of an overflow weir 62 at one end of each trough, the arrangement being such as to maintain a sufficient level of water within the troughs to cover the discharge ends 58 of all of the siphons 56. The level of such water within the troughs 60 will, nevertheless, be so regulated by the weirs 62 as to be at all times below the minimum level of the liquid above the filter beds 28 during the backwashing operation. Such minimum level, designated by broken lines 63, in FIGURE 1 is preferably determined by the upper horizontal edges of one of or more troughs 64 supported between the walls 16 and 22 of each filter unit with the bottom of the trough in each case respectively sloping toward the filter forebay 24. Thus backwash water passing upwardly through the filter bed, after the liquid thereabove has descended to its minimum level 63, will pass into the troughs 64 over their upper edges in a manner to skim off the foreign matter displaced from the filter beds as a result of the backwashing, and to permit such foreign matter to be carried through the troughs into the forebays 24 and thence through the backwash siphons 56. It will be seen that the discharge ends of the respective troughs 64 are supported in openings 65 through the upper edges of the partitioned walls 22 in such manner that the majority of the backwash water will be discharged through the troughs 64 rather than over the top of the walls 22.

For selectively controlling the siphons 56, the elevated and reversely curved medial portion of each such siphon has communicating therewith a fluid pipe or conduit 66 through which air may be evacuated from the upper portion of the siphon in order to prime it and institute the flow of liquid therethrough, and through which alternatively atmospheric air may be admitted to the siphon in order to terminate the backwashing action.

Figure 5:
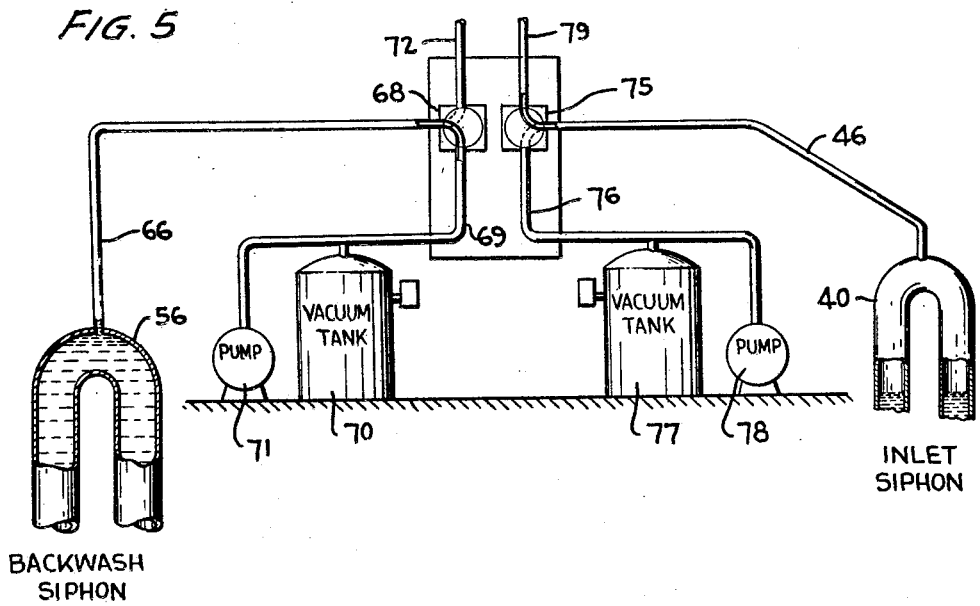
FIGURE 5 is a diagrammatic view of the preferred means for controlling the siphons as utilized in the invention.

As is shown in the diagrammatic view of FIGURE 5, the conduit 66 from each backwash siphon 56 may be operatively connected with a three-way valve 68 of conventional structure. In one position the valve 68 connects the conduit 66 to an evacuation line 69 leading to a vacuum tank 70 and its associated vacuum pump 71. In another position, the valve 68 may connect the conduit 66 to a vent pipe 72 leading to the atmosphere whereby to permit entry of air into the siphon 56 to discontinue the passage of fluid therethrough. Normally vacuum pump 71 is controlled so as to limit the vacuum in tank 70 to that required to prime the siphon 56 without flooding the tank or pump with liquid.

A similar control arrangement may be employed for each of the inlet siphons 40. Thus referring to FIGURES 1 and 5, it will be seen that a conduit 46 extends from the intermediate raised portion of each siphon 40 to establish communication between said portion and a control valve 75 of the three-way type. The valve 75 is operated in one position to establish communication between the siphon 40 and the evacuation line 76 leading to the vacuum tank 77 and pump 78. In another position it is operative to establish communication between the conduit 46 and the vent line 79 leading to the atmosphere whereby to permit discontinuance of the siphon action. Vacuum pump 78 is controlled so as to limit the vacuum in tank 77 to that required to prime siphon 40, without flooding the tank or pump with liquid.

*Operation*

In the operation of a battery of filter units in accordance with the invention normally all of the units of the battery will be in continuous filter operation jointly withdrawing influent from the conduit 33 and discharging the filtrate into the filtrate conduit 48 from which it is ultimately delivered into the storage reservoir 52. Normally the filtering action will occur when the depth of influent above the filter bed in a given unit is between the minimum and maximum operating levels as indicated by the broken lines 80 and 82 in FIGURE 1. It will be seen that the level 80 is that of the filtrate within the filtrate conduit 48 so that when the level of influent drops to this level 80 no flow of liquid through the filter bed 28 will occur due to the equalized pressures. The level 82 is even with the level of influent liquid in the various seal boxes 36 and when the liquid approaches this level above the filter beds the inlet siphon 40 of any filter unit in which this condition occurs will automatically be rendered inoperative. This will, of course, automatically prevent overflowing of any filter unit the bed of which may have become so clogged or obstructed from continuous use as to cause an undue rise of the level of liquid above the filter bed, and distribute its flow among the other filters until the situation is remedied.

As is well known, during continued use of a given filter unit, its filter bed will progressively become clogged or obstructed by the solids which are filtered out of the influent in passing through the bed and which form a slimy deposit. Thus, from time to time, it is necessary to backwash each unit to remove this deposit and restore the filter bed to its original operation condition.

When it is thus desired to backwash any given filter unit as, for instance, the unit 14 shown on the left hand side of FIGURE 4, the inlet siphon 40 of that unit will normally be vented as shown to discontinue the delivery of influent through it, thus allowing the level in the filter to drop to the minimum operating level 80, at which level the cleaning and backwashing will be started. The backwash siphon 56 of the same unit which is normally vented and inoperative during operation of the unit, will be primed by actuation of its associated air valve 68 (FIGURE 5) to withdraw the air from this siphon and commence the flow of liquid through it into the trough 60. At this time, the liquid level above the filter bed, due to clogging of the filter will normally have assumed a level somewhere near the minimum operating level 80. However, as the liquid is drawn off through the siphon 56, the level will drop toward that indicated by the broken line 63, and below the level of filtrate within the conduit 48. Accordingly a reverse flow of filtrate from the conduit 48 will pass freely through the passages 54 and 32 and upwardly through the filter bed 28 to backwash the same. Since the other filter units not then being backwashed will contribute their output of filtrate to the conduit 48, the level of filtrate within the conduit will be maintained constant or substantially so during the backwashing operation. As the backwashing fluid passes upwardly through the filter bed 28, it will carry upwardly with it the accumulated slime and impurities and will escape into the troughs 64 over their upper edges. It will then be discharged from said troughs into the filter forebay 24 and thence upwardly through the siphon 56 and into the backwash water drain trough 60. When it is desired to terminate the backwashing action, the siphon 56 is vented by appropriate actuation of its controlling air valve 68 and the inlet siphon 40 is primed by actuation of its associated valve 75 of FIGURE 5 in order to recommence the supply of influent liquid into the filter so that the filtering action may be resumed as soon as the liquid above the filter bed reaches the minimum operating level above the broken line 80 of FIGURE 1.

During the filtering operation, with the inlet siphon primed and the outlet siphon 56 vented and therefore inoperable, the relative liquid levels within the various parts of the filter unit will be substantially as shown on the right hand side of FIGURE 4.

It is highly desirable to discontinue the delivery of influent liquid to any given filter unit during the time that that unit is being backwashed. The desirability of this arises from the fact that the influent liquid within the conduit 33 will normally have been treated with expensive chemicals preparatory to being delivered into the conduit 33 and it would involve a waste of such chemicals to cause any appreciable amount of this treated liquid to bypass the filter structure.

However, aside from this consideration, it is not essential that the inlet siphons 40 or other means for controlling and discontinuing the delivery of influent into the individual filter units be supplied. It will be apparent that even though the siphon 40 of a given unit remains operative to supply liquid during a backwashing cycle, the liquid thus supplied will be delivered by gravity down the trough 38 and into the forebay 24 of its unit to be there discharged together with backwash water through the siphon 56. To this end, it will be noted that the siphons 56 are of larger cross sectional area and capacity than the inlet siphons 40.

In general, therefore, it will be seen that the invention comprises a filter construction embodying an extremely compact structure capable of being formed of concrete or the like material without the need for liquid valves or piping other than such as constitutes a part of the siphons. Moreover, due to the arrangement employing but a single set of inlet and filtrate conduits for two different banks or rows of filter units, it is possible to secure important economies of material in the construction of this type of filter while materially simplifying the construction and operation.

In this application I have shown and described only the preferred embodiment of my invention, simply by way of illustrating the preferred mode of practicing my invention. I recognize, however, that the invention is capable of other and different embodiments and its several details may be modified in various ways, including a circular layout where each of the filters forms a segment of a circle and the common walls between them are radial. Accordingly, the drawings and description herein are to be considered as merely illustrative in nature and not as exclusive.

The system provides for automatically reducing or stopping the flow to any filter in which the loss of head exceeds the maximum permissible limit and at the same time proportions any flow not passing a dirty filter through the other filters remaining in normal service. This also occurs when a filter is being washed or taken out of service for repairs. These features and advantages also constitute part of my invention.

Having thus described my invention, I claim:

1. A gravity flow backwash filter comprising a plurality of relatively adjoining filter units, each said filter unit comprising a horizontal filter bed spaced above the bottom of the unit to leave a drain space beneath said bed, each said unit opening upwardly immediately above its said filter bed into direct communication with the atmosphere, influent supply means for said filter common to all said units, means for selectively discontinuing the supply of influent to any given unit, a filtrate conduit common to all of said units, overflow means for maintaining filtrate therein at a substantially constant level above the filter beds, said influent supply means being disposed above the level of said filtrate conduit, means defining unrestricted liquid passages permitting bi-directional flow of filtrate between said filtrate conduit and said respective drain spaces in directions responsive solely to differences in liquid level above said filter beds and in said filtrate conduit, in combination with backwash siphons for the respective filter unit, each siphon having an intake end depending into its respective filter unit below the said substantially constant level, a discharge end disposed externally of its respective unit at a level below its intake end, and an intermediate section between its said ends disposed at an elevation substantially above the filter bed of its respective unit, and means communicating with said intermediate section of each backwash siphon and operative selectively to evacuate air from and to permit its flow into said section, and means defining liquid seals for the respective ends of said backwash siphons, each said liquid seal for the intake end of a backwash siphon comprising a receptacle in the unit associated with said backwash siphon and having free communication with said unit at a level above the filter bed thereof.

2. A gravity flow backwash filter comprising relatively spaced parallel rows of filter units, each row containing a plurality of said units, said rows having relatively adjacent parallel walls, relatively remote parallel walls and a plurality of transverse walls extending between the said adjacent and remote walls in each row to define the said filter units, relatively low overflow walls extending through the respective units and subdividing each unit into a filter forebay adjacent to a said remote wall and a filter section bounded on one side by one of said adjacent walls, each said filter section comprising a bottom and a horizontal filter bed spaced above its bottom to leave a drain space beneath said bed each said filter section opening upwardly immediately above its said bed into direct communication with the atmosphere, said relatively adjacent walls defining between them the opposite sides of a filtrate conduit common to all said units, said filtrate conduit being formed with an overflow outlet for maintaining its contents at a substantially constant level above said filter bed and overflow walls, said adjacent walls being formed with free unrestricted passages arranged to permit free bidirectional flow of filtrate between said filtrate conduit and said respective drain spaces in directions responsive solely to differences in liquid level above said filter beds and in said filtrate conduit, means maintaining an influent supply at a level above said filtrate conduit, said supply being common to and normally communicating with each of said units, selectively controllable means for discontinuing the influent supply to any given unit, in combination with selectively controllable means for draining liquid from above said filter section of any unit to a level below that of said filtrate conduit to initiate a backwashing action, said last mentioned means comprising a plurality of backwash siphons associated with the respective units, each such siphon having an intake end depending into the filter forebay of its unit below the level of the filter bed associated therewith, a discharge end disposed externally of its unit at a level below its intake end, and an intermediate section between its said ends disposed at an elevation substantially above the filter bed, means defining a liquid seal for said discharge end of each backwash siphon, and means communicating with said intermediate sections of each of said siphons and operative selectively to evacuate and to admit air into said sections.

3. A gravity flow backwash filter comprising relatively spaced parallel rows of filter units, each row containing a plurality of said units, said rows having relatively adjacent parallel walls, relatively remote parallel walls and a plurality of transverse walls extending between the said adjacent and remote walls in each row to define the said filter units, each said filter unit comprising a bottom and a horizontal filter bed spaced above its bottom to leave a drain space beneath said bed, each said filter unit opening upwardly immediately above its said bed into direct communication with the atmosphere, means in each unit defining a liquid receptacle having free communication with the unit at a level above the filter bed thereof, said relatively adjacent walls defining between them the opposite sides of a filtrate conduit common to all said units, said filtrate conduit being formed with an overflow outlet for maintaining its contents at a substantially constant level above said filter beds and receptacles, said adjacent walls being formed with free unrestricted passages arranged to permit free bidirectional flow of filtrate between said filtrate conduit and said respective drain spaces in directions responsive solely to differences in liquid level above said filter beds and in said filtrate conduit, means maintaining an influent supply at a level above said filtrate conduit, said supply being common to and normally communicating with each of said units, and selectively controllable means for discontinuing the influent supply to any given unit, in combination with selectively controllable means for draining liquid from above said filter section of any unit to a level below that of said filtrate conduit to initiate a backwashing action in any selected unit, said last mentioned means comprising a plurality of backwash siphons associated with the respective units, each said siphon having an intake end depending into the receptacle of its respective unit below the level of the filter bed of said unit, a discharge end disposed externally of its said unit at a level below its intake end, and an intermediate section between its said ends disposed at an elevation substantially above the filter bed, means defining a liquid seal for said discharge end, and means communicating with said intermediate sections of each of said siphons and operative selectively to evacuate and to admit air into said sections.

4. A gravity flow backwash filter comprising a row of filter units containing a plurality of said units, means subdividing each unit into a filter forebay and a filter section, each said filter section comprising a bottom and a horizontal filter bed spaced above its bottom to leave a drain space beneath said bed, each said filter section opening upwardly immediately above its said bed into direct communication with the atmosphere, influent supply means for said filter comprising an influent conduit parallel to said row of units on one side thereof and at a level above said filter beds, means defining influent passages normally establishing communication between said influent conduit and each of said filter units, a filtrate conduit beneath and parallel to said influent conduit, said filtrate conduit being formed with an overflow outlet for maintaining its contents at a substantially constant level above said filter bed but below the level of liquid in said influent supply means, said units respectively being formed with free unrestricted passages permitting bidirectional flow of filtrate between said filtrate conduit and said respective drain spaces in directions responsive solely to differences in liquid level above said filter beds and in said filtrate conduit, in combination with backwash siphons for the respective units, each said siphon having an intake end depending into the said filter forebay of its unit below the upper level of the filter bed of its unit, a discharge end disposed externally of its said unit at a level below its intake end, means defining a combined waste water discharge trough and liquid seal for said discharge end, said siphon having an elevated intermediate section between its said ends, and means communicating with said intermediate sections of the respective siphons for selectively evacuating and admitting air from and to said sections, each said backwash siphon being of larger internal cross section and having a greater liquid flow capacity than the influent passage of its respective unit.

5. A gravity flow backwash filter comprising a row of filter units containing a plurality of said units, each said unit comprising a bottom and a horizontal filter bed spaced above its bottom to leave a drain space beneath said bed, each said unit opening upwardly immediately above its said bed into direct communication with the atmosphere, influent supply means for said filter comprising an influent conduit parallel to said row of units on one side thereof and at a level above said filter beds, means defining influent passages normally establishing communication between said influent conduit and each of said filter units, a filtrate conduit beneath and parallel to said influent conduit, said filtrate conduit being formed with an overflow outlet for maintaining its contents at a substantially constant level above said filter bed but below the level of liquid in said influent supply means, said units respectively being formed with free unrestricted passages permitting bidirectional flow of filtrate between said filtrate conduit and said respective drain spaces in directions responsive solely to differences in liquid level above said filter beds and in said filtrate conduit, a liquid receptacle in each unit having free communication with the unit at a level above the filter bed thereof, in combination with backwash siphons for the respective units, each said siphon having an intake end depending into the receptacle for its said unit to a level below the upper level of the filter bed of its unit, whereby each said receptacle defines a liquid seal for the intake end of its associated backwash siphon, each said backwash siphon also having a discharge end disposed externally of its said unit at a level below its intake end, means defining a combined waste water discharge trough and liquid seal for said discharge end, said siphon having an elevated intermediate section between its said ends, and means communicating with said intermediate sections of the respective siphons for selectively evacuating and admitting air from and to said sections, each said backwash siphon being of larger internal cross section and having a greater liquid flow capacity than the influent passage of its associated unit.

References Cited in the file of this patent

UNITED STATES PATENTS

| | | |
|---|---|---|
| 647,780 | Wilson | Apr. 17, 1900 |
| 2,084,659 | Streander | June 22 1937 |
| 2,879,893 | Stebbins | Mar. 31, 1959 |